Nov. 13, 1956  F. C. ALBRIGHT  2,770,430
AIRCRAFT UNDERCARRIAGE
Filed Nov. 3, 1950  3 Sheets-Sheet 2
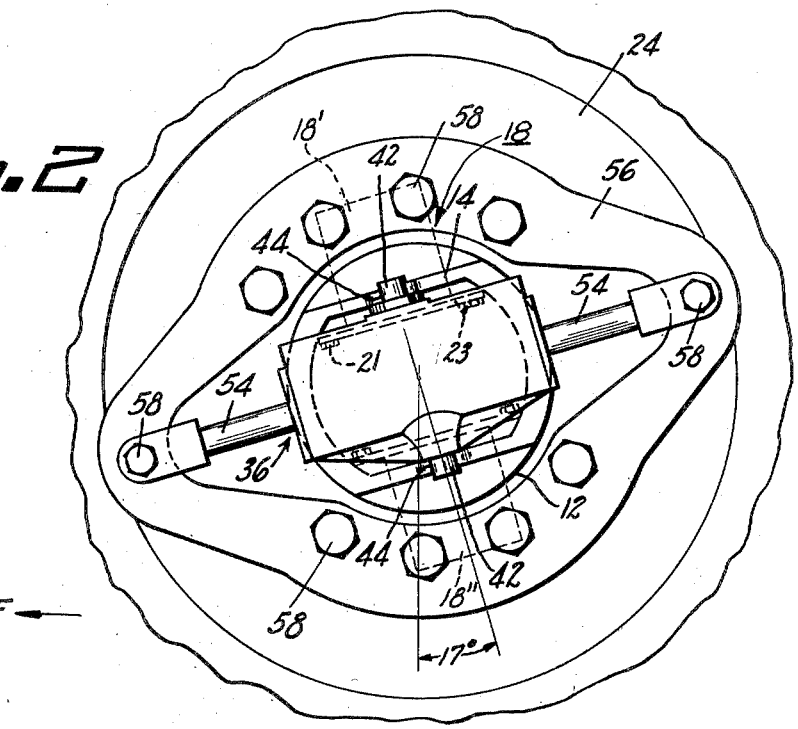
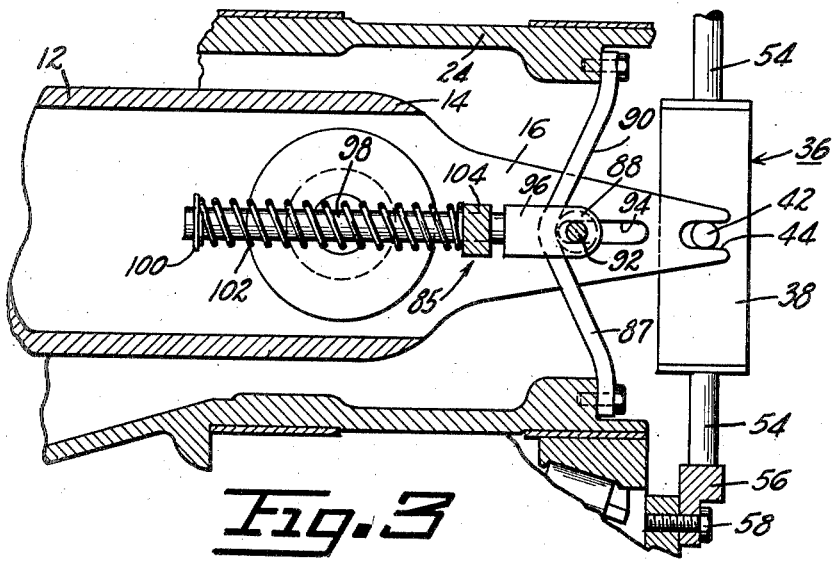
INVENTOR.
FRANKLIN C. ALBRIGHT
BY
*G A Gust*
ATTORNEY Nov. 13, 1956     F. C. ALBRIGHT     2,770,430
AIRCRAFT UNDERCARRIAGE Filed Nov. 3, 1950     3 Sheets-Sheet 3

INVENTOR.
FRANKLIN C. ALBRIGHT
BY
ATTORNEY

United States Patent Office 2,770,430
Patented Nov. 13, 1956

2,770,430

AIRCRAFT UNDERCARRIAGE

Franklin C. Albright, South Bend, Ind., assignor to Bendix Aviation Corporation, South Bend, Ind., a corporation of Delaware Application November 3, 1950, Serial No. 193,980

19 Claims. (Cl. 244—103)

The present invention relates to aircraft undercarriages and more particularly to steerable and castering landing gear.

In recent years, with the development of larger and heavier aircraft, landing fields, of necessity, have been required to grow substantially in size. Since it is necessary for ease in taking off and landing, to head the aircraft into the wind, airfields have been made to cover large areas to afford adequate runway lengths for any direction of wind. Airfields, needless to say, are expensive. The surfaces must be levelled, drained, and prepared for use by expected aircraft, and in some instances, for the heavier type ships, must be reinforced with thicknesses of gravel, stone, concrete, and other materials.

In order to avoid the relatively great expense of constructing the conventional airport, it has been suggested that the airport consist of only one relatively narrow landing strip. However, when the wind traverses the strip at a right angle thereto, a severe and hazardous condition prevails for taking off and landing. This wind is generally referred to as a cross wind and creates aerodynamic pressures on the aircraft which seriously affect its stability both on and near the ground. Actually, in taking off, the plane tends to be blown laterally thereby placing a side strain on the landing gear, and in landing, the same result obtains. However, if the pilot is skilled in the art of cross wind takeoffs and landings, he can maneuver the plane in such a manner so as to avoid undue or damaging strain on the landing gear.

It is therefore an important object of this invention to provide an undercarriage which makes possible the use of a single strip runway for all wind conditions without the need for any particular cross wind maneuvering skill of the pilot. In achieving this object, freely castering wheels or steerable wheels are used which will permit alignment of the landing gear with the direction of the runway while the nose of the aircraft is directed either fully or partially into a cross wind. As is well known, castering wheels tend to oscillate or shimmy violently during maneuvering of the aircraft on the ground. However, it is possible to limit or dampen this tendency to shimmy whereby the utility is improved and in most instances made completely satisfactory.

Therefore, it is another object of the present invention to provide a shimming damping device for a castering wheel, said device being of the fluid operable type. It is another object to provide a fluid operable device for aligning the wheel or wheels with the direction of aircraft transport just prior to landing contact of the aircraft with the ground.

It is still another object to provide a device which lands itself to use as either a steering control or as a shimmy damping device.

In the drawings:

Figure 2 is a partial side elevation of Figure 1 illustrating the fluid operable device used as a shimmy damping device;

Figure 3 is a partial section taken substantially on section line 3—3 of Figure 1;

Figure 1:
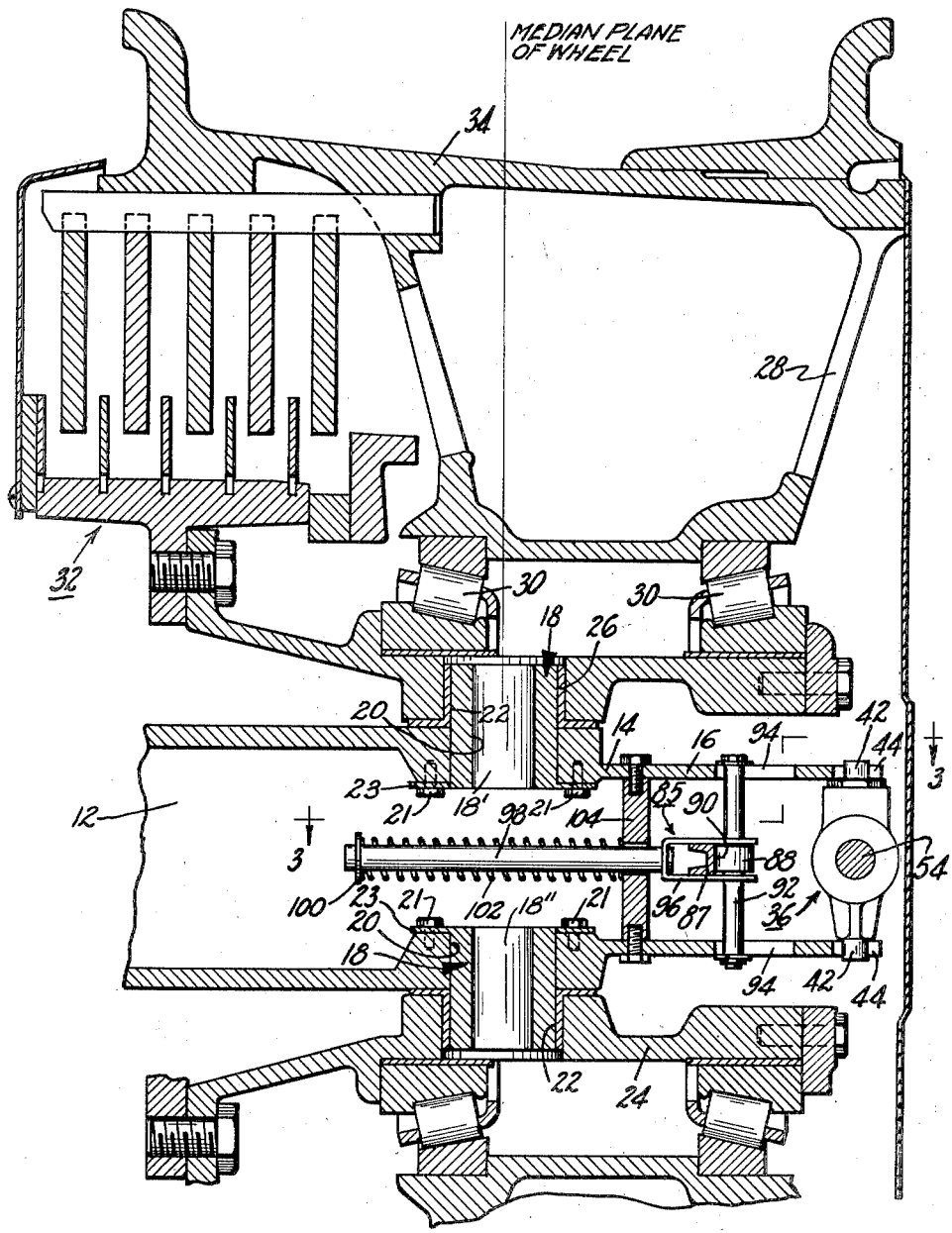
Figure 1 is a partial axial section of an embodiment of the present invention.

Referring now to the drawings, a strut 12', as shown for example by the patent to Du Bois et al. 2,483,362, issued September 27, 1949, is adapted to be secured at its upper end to a portion of an aircraft (not shown) while its lower extremity carries a tubular cantilever axle 12 which is provided on its outer end with a reduced portion 14 having a pair of tapered sides 16. A two-piece kingpin 18, consisting of axially aligned kingpin portions 18' and 18", is diametrically secured to the axle 12. The portions 18' and 18" are secured in axially aligned holes 20 in axle 12 by means of bolts 21 which secure each of the kingpin portion flanges 23 to the inner wall of axle 12. It is to be noted in Figure 1, that the ends of each of the respective kingpin portions 18' and 18" are received in diametric sockets 22 with a castering hub 24, which might be also designated as a pivot block or supporting hub. This pivot block may assume any desired configuration; however, in this particular instance it is illustrated as being of annular shape. Swivel bushings 26 are interposed between peripheries of the outer ends of kingpin portions 18' and 18" and the openings 22 in the supporting hub 24.

A wheel 28 is rotatably mounted on the outer periphery of castering hub 24 by means of the axially spaced anti-friction bearings 30 which are held in place by any suitable means. Wheel 28 may be provided, as illustrated, with a brake assembly generally indicated by the reference numeral 32. This brake assembly 32 may be of any preferred design, and as illustrated, is of the disk type, as shown for example in the patent to Du Bois et al. 2,483,362, issued September 27, 1949.

It is to be recognized, that the axis of the kingpin 18 lies in the median plane of the wheel rim 34, which virtually divides this rim into two equal annular halves. The reason for this location is obvious, it being to balance the forces tending to pivot the wheel 28 around kingpin 18 and provides a true trail of the wheel 28 as it is being transported along by kingpin 18. Referring to Figure 2, it is also to be noted that the kingpin 18 is slanted with the vertical so that the axis of the kingpin 18 makes an angle of approximately 17° with the vertical, as illustrated. With the wheel being transported along in a direction of the arrow F (Figure 2) a true castering effect is realized. While the angle 17° has been specifically noted, it is to be understood that the angle may be changed without departing from the scope of this invention.

As previously mentioned, the caster type wheel tends to oscillate or shimmy about its kingpin which impairs its usefulness on aircraft. In order to overcome this objectionable shimmy, a hydraulic shimmy dampener, generally indicated by reference numeral 36, is provided, which comprises a hydraulic cylinder 38 provided with a uniform diameter bore 40. This cylinder 38 is provided on its outer periphery with a pair of diametrically spaced trunnions 42 which slidably engage diametrically opposite end slots 44 in tapered sides 16 of axle 12. It is to be noted that the length dimensions of these slots are substantially parallel to the axis of axle 12 while the width dimensions are substantially coextensive with the diameters of the trunnions 42. With this particular arrangement, the cylinder 38 is held against endwise movement while being capable of lateral movement or movement parallel to the axis of axle 12.

A pair of plugs 46 are screwed into the ends of cylinder bore 40 and are provided with coaxial openings 47 for a purpose hereinafter to be stated. Cylinder bore 40 receives for reciprocation a piston 48 which defines two variable volume fluid-containing chambers 50 and 52. Extending from each side of piston 48 is a connecting rod 54 which reciprocably projects through the aforementioned openings 47 in such a manner as to prevent the escape of fluid from either chamber 50 or 52. This connecting rod 54 extends substantially diametrically across the castering hub 24 and is secured at its ends to an elliptically shaped ring 56 which is in turn rigidly secured to one side of hub 24 by means of a plurality of bolts 58.

Thus it is seen, that by oscillating wheel 28 about kingpin 18, piston 48 is caused to reciprocate in cylinder bore 40 and trunnions 42 are accordingly caused to shift in the lengths of slots 44.

Figure 4:
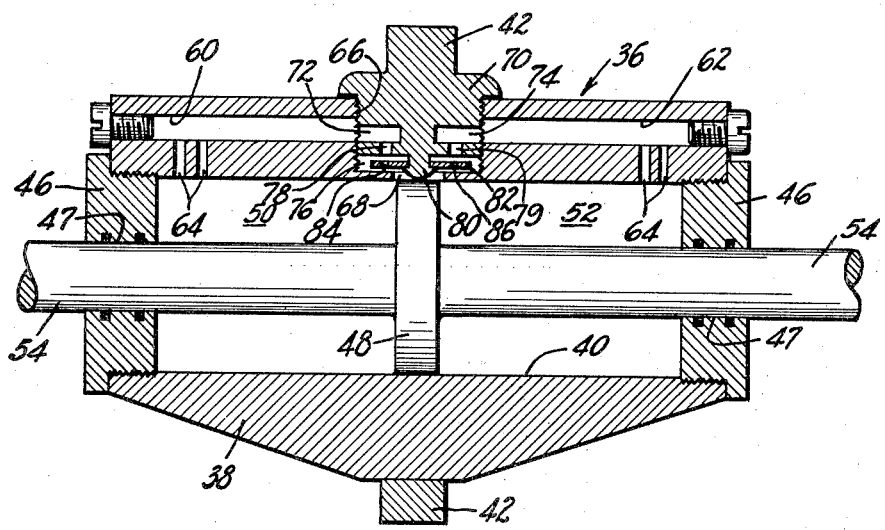
Figure 4 is an axial section of the damping device of Figure 3.

Two longitudinally extending passages 60 and 62 are provided in the wall of cylinder 38, the outer ends of these passages communicating with chambers 50 and 52, respectively, by means of connecting orifices 64. Midway between the outer ends of these passages and in the wall of cylinder 38 is formed a threaded cavity or socket 66 which has an opening 68 in its bottom communicating with the cylinder bore 40. A threaded plug 70, which in this instance carries one trunnion 42, is received in socket 66 and has a length somewhat less than the socket depth so as to provide a chamber 76 between the inner end of plug 70 and the bottom of socket 66. A pair of grooves 72 and 74 are cut on diametrically opposite sides of plug 70 and are arranged to communicate with passages 60 and 62, respectively, and with respective plug openings 78 and 79. Projecting radially inwardly from the inner end of plug 70 is a headed stem 80, preferably of square cross section, which reciprocably receives a flutter valve 82 to lie within the chamber 76, the fit between valve 82 and the stem 80 being such as to prevent the valve 82 from rotating. Valve 82 is provided with a pair of diametrically disposed tiny apertures 84 and 86 which are intended to register with plug openings 78 and 79, respectively. Each of these apertures 84 and 86 are considerably smaller than the companion openings 78 and 79 for a purpose to become apparent hereafter. With the valve 82 moved upwardly from its position in Figure 4, fluid communication from chamber 76 and, for example, to passage 60 is substantially restricted since the flow is metered by the aperture 84. However, with the valve 82 in the downward or illustrated position, the flow from passage 60 to chamber 76 will be substantially less restricted inasmuch as the port 78 is considerably larger than the companion aperture 84. This same condition is true for aperture 86 and opening 79.

In the use of free castering wheels, on aircraft, the wheels are normally aligned in parallelism with the longitudinal axis of the aircraft. This being the case, when the aircraft is making a cross-wind landing, that is, the plane is crabbed into the wind so that its longitudinal axis is not in alignment with its direction of movement, the wheels will also be out of parallelism with the direction of motion and with the runway being approached. When the wheel initially contacts the ground, it is necessary that it instantly align itself in the direction of aircraft motion with respect to the ground, since if this did not happen, it is obvious that severe side loads would be imposed on the landing gear which would either cause its failure with consequent damage to the aircraft or cause extremely difficult handling of the aircraft. It is to be mentioned here that the damping device 36 just described permits substantially instantaneous alignment of the castering wheels with the runway and thereafter prevents the wheels from oscillating or shimmying.

This operation is as follows. Assuming the piston 48 to be in its illustrated position when the wheel 28 is properly centered, sudden pivotal movement of wheel 28 will effectively displace piston 48 in one direction. Assuming this direction to be toward the right, liquid in chamber 52 will be forced out of orifices 64 through passage 62, plug groove 74, port 79, around valve 82, around stem 80, out of port 68, and into the enlarged chamber 50. Since this flow is in a direction to open the valve 82, the only resistance (which is made purposely slight) to the pivotal action of the wheel 28 will be due to the sizes of the various openings through which the liquid must pass. However, with a reverse pivotal motion of this wheel, the piston 48 will be moved to the left which will force fluid against valve 82 thereby forcing the latter upwardly bringing aperture 86 into registry with the opening 79. The flow of fluid is then through the small aperture 86 which obviously reduces the flow return to chamber 52 and consequently reduces the speed of piston 48 as it returns to its illustrated position. Thus it is seen, that the initial motion of piston 48 is substantially unrestricted whereas for the return direction, the motion will be resisted thereby damping the tendency of the wheel to shimmy.

Since in modern type aircraft, it is customary to retract the landing gear into the wings or fuselage, it is necessary that the wheel be in a predetermined position before it is retracted. This predetermined position is usually sensed by a centering device which then acts to pivot the wheel about its kingpin to a point suitable for retracting. The present invention includes a wheel centering device which cooperates with a shimmy damping device 36 to serve the functions of resisting shimmy and centering the wheel just prior to retraction. This centering device is generally indicated by the reference numeral 85 and comprises a cam 87 which extends substantially parallel to the connecting rod 54 of shimmy dampening device 36, and is diametrically secured to castering hub 24. This cam 87 is of a shallow V shape and is dipped toward the kingpin. A roller or cam follower 88 is arranged to engage the inner side 90 of the cam 87 and is partially supported in such engagement by a spindle 92 which has its ends received in a pair of diametrically disposed slots 94 in the sides 16 of axle 12. The length dimension of these slots is in line with the axis of axle 12 and has an extent which corresponds to the degree of dip of cam 87. A yoke 96 rotatably supports the spindle 92 and straddles both the cam 87 and roller 88. The base portion of the yoke 96 is secured to a relatively long rod 98 which extends substantially parallel to the axis of axle 12 and has on its outer end a spring retaining ring 100. A compressed spring 102 is telescoped over rod 98 to bear at one end against the collar 100 and at its other end against an apertured reaction block 104 which is fastened across the interior of the reduced axle end 16.

When the wheel 28 is pivoted out of its illustrated position, the cam 87 moves substantially longitudinally causing the roller 88 to roll up one side thereof. This action compresses spring 102 so that when the force pivoting wheel 28 is removed, the compressed load of the spring 102 acting on roller 88 forces the return pivotal movement of the wheel 28 to a position where the roller 88 engages the bottom or apex of the cam surface 90. Thus, if the airplane is taking off cross-wind so that its line of transport is at an angle to the plane's longitudinal axis, the moment the plane leaves the ground the spring 102 will act on the roller 88 and the cam wheel 87 to pivot the wheel 28 to a point which corresponds to that illustrated. The wheel is then readied for retraction into the airplane.

While the above-described centering device 85 has been defined as serving the function of facilitating wheel retraction, it is to be understood that this device 85 serves an important function in connection with the shimmy dampener 36. It is to be noted that outward movement of the piston 48 from its illustrated center position is virtually unrestricted while movement thereof toward the center is met with increased opposition. Therefore, in order for the associated wheel to initially freely caster into alignment with aircraft transport, it is necessary that the piston 48 start from its centered location in cylinder 38. The centering device 85 obviously serves to keep this piston 48 properly located so that the shimmy dampener 36 will not resist the initial wheel pivot or caster.

Figure 5:
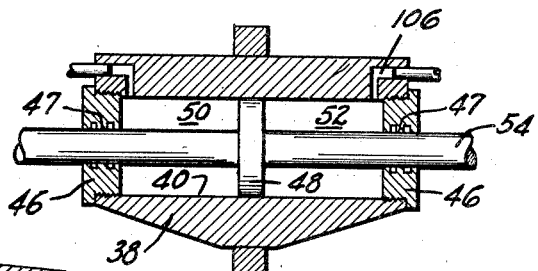
Figure 5 is an illustration of a hydraulic device which constitutes a slight modification of the device of Figure 4 to provide for steerability of an associated wheel.
Figure 6:
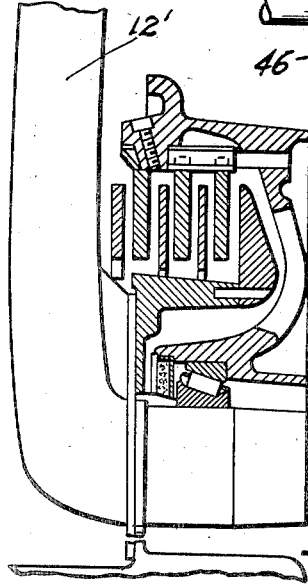
Figure 6 illustrates a typical upright strut supporting a cantilever axle upon which could be mounted the hub of the wheel involved in this invention.

By a slight modification of the shimmy device 36, as illustrated in Figure 5, a suitable motor is obtained by which the wheel may be steered. Instead of the valve mechanism of Figure 4, a passage 106 is provided in each end of cylinder 38 which communicates with a manually controlled pump (not shown), so that injection of fluid pressure into one passage 106 will force piston 48 in one direction while injection of fluid pressure in the other passage 106 will cause return motion of piston 48 and consequent steering movement of the wheel 28.

In brief summary, the construction of the present invention possesses utility as a shimmy damping device or as a steering control. While particular structures have been shown, it is conceivable that modifications may be made without departing from the scope of this invention, for example, the flutter valve assembly of the shimmy dampener could be manually controlled by means of a shut-off valve whereby movement of the piston 48 could be controlled for steering purposes.

Although this invention has been described in connection with certain specific embodiments, various changes in the form and relative arrangements of the parts may be made to suit requirements.

I claim:

1. In an aircraft undercarriage including a wheel rotatably mounted on a pivot block, a kingpin supporting said pivot block for pivotal movement and disposed diametrically with respect to and inside said wheel, a substantially horizontal stationary axle secured to said kingpin at right angles thereto and extending through said pivot block, one end of said axle terminating substantially flush with the corresponding lateral side of said wheel; shimmy damping means including a hydraulic cylinder carried intermediate its ends by said outer axle end and means for holding the same for a predetermined axial movement but against radial movement with respect to said axle, a piston reciprocably received in said cylinder and having a rod projecting from both sides thereof which extends diametrically across said pivot block, means operatively connecting the ends of said rods to said pivot block, said piston defining two variable volume liquid-containing chambers in said cylinder, and valve means operatively associated with said chambers whereby sudden movement of said piston from rest in one direction will be substantially unrestricted while movement in the opposite direction thereafter will be restricted.

2. In an aircraft undercarriage including an upright strut, a horizontal cantilever axle secured to the lower extremity of said strut, a kingpin secured to said axle and projecting radially outwardly beyond the outer periphery of said axle, an annular pivot block pivotally mounted on said kingpin whereby the axis of said kingpin is substantially coincident with a diameter of said block, a wheel mounted for rotation on the outer periphery of said block in concentric relation with said axle and with said kingpin positioned midway between the wheel sides whereby said wheel may be pivoted about said kingpin, and a shimmy damping device operatively connected to the outer end of said axle whereby said device moves a limited amount parallel to the axis of said axle; said shimmy damping device comprising a hollow cylinder including means for holding the same against endwise movement, a piston reciprocably received in said cylinder to define two variable volume liquid-containing chambers, said piston being secured at both of its sides by means of a connecting member to said pivot block whereby pivotal movement of said wheel about said kingpin will move said piston in said cylinder, said cylinder chambers having orifices through which passes liquid in response to movement of said piston which tends to dampen the tendency of said wheel to oscillate about said kingpin.

3. In an aircraft undercarriage comprising an upright strut, a horizontal cantilever axle secured to the lower extremity of said strut, a kingpin secured to said axle and projecting radially outwardly beyond the outer periphery of said axle, an annular pivot block pivotally mounted on said kingpin with the axis of said kingpin substantially coincident with a diameter of said block, a wheel mounted for rotation on the outer periphery of said block in concentric relation with said axle and with said kingpin positioned midway between the wheel sides whereby said wheel may be pivoted about said kingpin, and a shimmy damping means operatively associated with the outer end of said axle and having a connection therewith which permits said means to move a limited amount parallel to the axis of said axle; said shimmy damping means comprising a hollow cylinder including means for holding the same against endwise movement, a piston normally centrally located in said cylinder and reciprocably received therein to define two variable volume liquid-containing chambers, said piston being secured at both of its sides by means of a connecting member to said pivot block whereby pivotal movement of said wheel about said kingpin will move said piston in said cylinder, said cylinder chambers having orifices through which passes liquid in response to movement of said piston thereby tending to dampen the tendency of said wheel to oscillate about said kingpin, a cam operatively connected to said cylinder and piston and having a dipped central portion and being diametrically secured to one side of said pivot block, said cam lying in a plane substantially perpendicular to the axis of said kingpin, a roller engaging the dipped side of said cam and being guided for axial movement while being held against radial movement with respect to said axle, and means yieldably urging said roller into engagement with said cam so that pivotal movement of said cam about said kingpin will cause the aforesaid axial movement of said roller, said roller thereupon tending to pivot said cam and the attached pivot block to a position which corresponds to the position of engagement of said roller with the dipped portion of said cam and tending to urge the piston to its normally central position in said cylinder.

4. An aircraft undercarriage comprising an upright strut, a horizontal cantilever axle secured to said strut, a kingpin secured between its ends to said axle to project radially outwardly beyond the outer periphery of said axle, a castering hub pivotally mounted on said kingpin, a wheel mounted for rotation on said hub whereby said wheel may caster about said kingpin, and a shimmy damping device operatively associated with the outer end of said axle and having a connection therewith which permits said device to move a limited amount parallel to the axis of said axle, said device comprising a hollow cylinder including means for holding the same against endwise movement, a piston reciprocably received in said cylinder to define two variable volume liquid-containing chambers, said piston being operatively secured at both of its sides by means of a connecting member to said wheel whereby pivotal movement of said wheel about said kingpin will move said piston in said cylinder, said cylinder chambers having orifices through which passes liquid in response to movement of said piston thereby tending to dampen the tendency of said wheel to oscillate about said kingpin.

5. A vehicle undercarriage comprising a fixed axle, a kingpin transversely secured to said axle, a castering hub pivotally mounted on said kingpin, a wheel carried for rotation on said hub and for pivotal movement about said kingpin, and a hydraulic shimmy damping device partially supported by said axle and having a connection therewith which permits said device to move a limited amount with respect to the axis of said axle and comprising a cylinder, a piston reciprocably received by said cylinder and defining two variable volume fluid-containing chambers, a pair of passages in the wall of said cylinder, one passage communicating with the outer end of one chamber and the other passage communicating with the outer end of the other chamber, the other ends of said passages opening into the central interior portion of said cylinder and having regulated communication therewith, said regulated communication being provided by a valve actuated by movement of said piston whereby movement of said piston from the center of said cylinder will be substantially unretarded while return movement to the center will be resisted.

6. A vehicle undercarriage comprising a fixed axle, a kingpin transversely secured to said axle, a castering hub pivotally mounted on said kingpin, a wheel carried for rotation on said hub and for pivotal movement about said kingpin, and a hydraulic shimmy damping device partially supported by said axle and having a limited amount of relative movement with respect to the axis of said axle, said device comprising a cylinder, a piston reciprocably received by said cylinder defining two variable volume fluid-containing chambers, a pair of passages in the wall of said cylinder, one passage communicating with the outer end of one chamber and the other passage communicating with the outer end of the other chamber, the other ends of said passages opening into the central interior portion of said cylinder and having regulated communication therewith, a valve for controlling flow of fluid through said last-mentioned passage openings and having apertures smaller in size than said openings adapted to register with said openings, said valve being pressure actuated by movement of said piston whereby movement of said piston from the vicinity of said last-mentioned openings will force fluid from one chamber, through the corresponding passage, and against said valve to open same and to allow the substantially unrestricted flow of fluid into said cylinder, and return movement of said piston will force fluid in the opposite direction to close said valve which retards the flow of fluid through said last-mentioned passage thereby retarding the speed at which said piston returns to the aforementioned vicinity of said openings.

7. A vehicle undercarriage comprising a fixed axle, a kingpin transversely secured to said axle, a castering hub pivotally mounted on said kingpin, a wheel carried for rotation on said hub and for pivotal movement about said kingpin, and a hydraulic shimmy damping device partially supported by said axle and having a limited amount of relative movement with respect to the axis of said axle, said device comprising a cylinder, a piston reciprocably received by said cylinder defining two variable volume fluid-containing chambers, a pair of passages in the wall of said cylinder, one passage communicating with the outer end of one chamber and the other passage communicating with the outer end of the other chamber, the other ends of said passages opening into a cavity provided in said cylinder wall, said cavity opening into said cylinder at a point where said piston is normally positioned and communicating with both chambers, a flutter valve disposed in said cavity and having relatively small apertures which are adapted to register with the cavity openings of said passages, said valve being actuable by movement of said piston, movement of said piston from its aforesaid normal position forcing fluid from the exhausting chamber, through the corresponding passage and against said valve to open same and to allow the substantially unrestricted flow of fluid into the enlarging chamber, and return movement of said piston forcing fluid in the opposite direction to close said valve which retards the flow of fluid through said last-mentioned passage thereby retarding the speed at which said piston returns ot its normal position.

8. A vehicle undercarriage comprising a wheel, a pivotable castering hub rotatably supporting said wheel and being adapted to be carried by a non-rotatable member, and a hydraulic control device adapted to be supported by said non-rotatable member and said hub, said device comprising a cylinder arranged to be operatively connected to said non-rotatable member and receiving for reciprocation a piston which is operatively connected to said hub, said hub and wheel being controlled by the action of hydraulic pressure on said piston.

9. A castering undercarriage for a vehicle comprising a wheel and a supporting hub therefor, said hub being pivotally supported on a fixed member to provide castering action for the wheel; a hydraulic shimmy damping device containing valve structure cooperating with fluid chambers therein for controlling oscillatory movement of said hub, said device being carried by said fixed member and said hub, and having relative movement with respect to said fixed member.

10. In a castering undercarriage for aircraft comprising a wheel and a supporting hub therefor, said hub being pivotally supported on a fixed member to provide castering action for the wheel; a shimmy damping device including a hydraulic cylinder partially supported by said fixed member, a piston reciprocably received by said cylinder having a normally central position therein and defining two variable volume liquid-containing chambers, means operatively associated between said cylinder and piston wherein fluid flow between said two chambers is controlled by said piston and in which said piston controls the resistance to castering movement of said wheel, a connecting rod projecting from each end of said piston and being secured to said hub, said piston being caused to move in said cylinder in response to castering movement of said wheel, a cam secured to said hub, said cam having the shape of a shallow V, a cam follower yieldably engaging the inner side of said cam, castering movement of said wheel being opposed by said follower as it rides on said cam, said cam and follower constantly urging said wheel to a predetermined position and the piston toward its normally central position in said cylinder once said wheel has been lifted off the ground and wherein oscillatory movement of said wheel upon landing will be dampened.

11. In a wheel castering undercarriage for aircraft comprising a wheel and a supporting hub therefor, said hub being pivotally supported on a fixed member to provide castering action for the wheel; a shimmy damping means including a hydraulic cylinder supported by said fixed member, a piston reciprocably received by said cylinder having a normally central position therein and defining two variable volume liquid-containing chambers, means operatively associated between said cylinder and piston wherein fluid flow between said two chambers is controlled by said piston for developing resistance to castering movement of said wheel and damping of oscillatory movement thereof, a connecting rod projecting from each end of said piston and being secured to said hub, said piston being caused to move in said cylinder in response to castering movement of said wheel, a cam secured to said hub, said cam having the shape of a shallow V, means acting on said cam yieldably opposing castering movement of said wheel and serving to position said wheel in a predetermined attitude and said piston in its normally central position in said cylinder once the wheel has been lifted off the ground and means operatively associated with said cylinder and piston whereby when said wheel is in said predetermined attitude said piston offers a minimum of resistance to initial castering movement of the wheel.

12. A shimmy damping device for use with a castered wheel comprising a fluid cylinder guided for movement in a direction substantially parallel to the wheel axis and held against movement in a direction perpendicular thereto, a piston reciprocably received in said cylinder and defining two variable volume fluid-containing chambers therein, and connecting means fastened to said piston and adapted to be secured to the castered wheel, castering movement of the wheel being restricted by corresponding movement of said piston in said cylinder.

13. Apparatus of the character described in claim 12 including a wheel centering device for returning the piston to a center position.

14. In a castering undercarriage for a vehicle comprising a wheel and a supporting hub therefor, said hub being pivotally supported on a fixed member to provide castering of said wheel, a hydraulic cylinder partially supported by said fixed member, a piston reciprocably received by said cylinder and defining two variable volume liquid-containing chambers, and a connecting rod projecting from said piston and being secured to said hub, movement of said piston in said cylinder causing dampened movement of said wheel.

15. Apparatus of the character described in claim 14 including a wheel centering device for returning the piston to a center position.

16. A shimmy damping device for use in an undercarriage for aircraft comprising a wheel and a supporting hub therefor pivotally supported on a fixed member whereby said wheel may be laterally swivelled; said damping device including a hydraulic cylinder partially supported by said fixed member, a piston reciprocably received by said cylinder having a normally central position therein and defining two variable volume liquid-containing chambers, means operatively associated between said cylinder and piston wherein fluid flow between said two chambers is controlled by said piston for damping out oscillatory movement of the aircraft wheel, a connecting rod projecting from each end of said piston and being secured to said hub, movement of said piston in said cylinder being in accordance with swivelling movement of said wheel, a cam secured to said hub, said cam having the shape of a shallow V, a cam follower arranged to yieldably engage the inner side of said cam, swivelling movement of said wheel being opposed by said follower as it rides on said cam, said cam and follower constantly urging said wheel and said piston to predetermined positions.

17. A shimmy damping device for use in an aircraft undercarriage comprising an upright strut, a horizontal cantilever axle secured to the lower extremity of said strut, a kingpin secured between its ends to said axle to project radially outwardly beyond the outer periphery of said axle, an annular pivot block pivotally mounted on said kingpin whereby the axis of said kingpin is substantially coincident with a diameter of said block, a wheel mounted for rotation on the outer periphery of said block in concentric relation with said axle and with said kingpin positioned midway between the wheel sides whereby said wheel may be pivoted about said kingpin; a hydraulic shimmy damping control device operatively associated with the outer end of said axle and having a connection therewith which permits said device to move a limited amount parallel to the axis of said axle, said device comprising a hollow cylinder held against endwise movement, a piston reciprocably received in said cylinder having a normally central position therein to define two variable volume liquid-containing chambers, means operatively associated between said cylinder and piston wherein fluid flow between said two chambers is controlled by said piston for damping out oscillatory movement of the aircraft wheel, said piston being secured at both of its sides by means of a connecting member to said pivot block whereby pivotal movement of said wheel will be in accordance with the movement of said piston in said cylinder, said cylinder chambers having orifices through which passes liquid for controlling movement of said piston, a cam having a dipped central portion and being diametrically secured to one side of said pivot block, said cam lying in a plane substantially perpendicular to the axis of said kingpin, a roller engaging the dipped side of said cam and being guided for axial movement while being held against radial movement with respect to said axle, means yieldably urging said roller into engagement with said cam so that pivotal movement of said cam about said kingpin will cause the aforesaid axial movement of said roller, said roller thereupon tending to pivot said cam and the attached pivot block to a position which corresponds to the position of engagement of said roller with the dipped portion of said cam wherein said piston is urged toward its normally central position in said cylinder whereby oscillatory movement may be controlled.

18. An aircraft undercarriage comprising an upright strut, a horizontal axle secured to said strut, a kingpin secured between its ends to said axle to project radially outwardly beyond the outer periphery of said axle, a castering hub pivotally mounted on said kingpin, a wheel mounted for rotation on said hub whereby said wheel may caster about said kingpin, and a shimmy damping device operatively associated with said axle and having a connection therewith to permit said device to move a limited amount relative to said axle, said device comprising a hollow cylinder held against endwise movement, a piston reciprocably received in said cylinder to define two variable volume liquid-containing chambers, said piston being operatively secured by means of a connecting member to said wheel whereby pivotal movement of said wheel about said kingpin will move said piston in said cylinder, said cylinder chambers having orifices through which passes liquid in response to movement of said piston thereby tending to dampen the tendency of said wheel to oscillate about said kingpin.

19. A vehicle undercarriage comprising a fixed axle, a kingpin secured between its ends to said axle to project radially outwardly beyond the outer periphery of said axle, a castering hub pivotally mounted on said kingpin, a wheel mounted for rotation on said hub whereby said wheel may caster about said kingpin, and a shimmy damping device operatively associated with the outer end of said axle and having a connection therewith which permits said device to move a limited amount parallel to the axis of said axle, said device comprising a hollow cylinder held against endwise movement, a piston reciprocably received in said cylinder to define two variable volume liquid-containing chambers, said piston being operatively secured at both of its sides by means of a connecting member to said wheel whereby pivotal movement of said wheel about said kingpin will move said piston in said cylinder, said cylinder chambers having orifices through which passes liquid in response to movement of said piston thereby tending to dampen the tendency of said wheel to oscillate about said kingpin.

References Cited in the file of this patent

UNITED STATES PATENTS

| | | |
|---|---|---|
| 857,494 | Slater | June 18, 1907 |
| 1,053,403 | Keiter | Feb. 18, 1913 |
| 2,106,289 | Wallace | Jan. 25, 1938 |
| 2,254,260 | Arcier | Sept. 2, 1941 |
| 2,397,640 | Bingham | Apr. 2, 1946 |
| 2,424,233 | Greenough | July 22, 1947 |
| 2,502,522 | Hoobler | Apr. 4, 1950 |
| 2,504,077 | Loudenslager | Apr. 11, 1950 |
| 2,508,351 | Bjere | May 23, 1950 |
| 2,522,032 | Gerry | Sept. 12, 1950 |
| 2,535,167 | Smith | Dec. 26, 1950 |
| 2,557,274 | Geisse | June 19, 1951 |
| 2,562,082 | Brown | July 24, 1951 |